United States Patent
Wang et al.

(10) Patent No.: US 7,860,305 B2
(45) Date of Patent: Dec. 28, 2010

(54) COLOR CORRECTION SYSTEM AND METHOD THEREOF

(75) Inventors: Te-Mei Wang, Hsin-Chu (TW);
Hung-Shing Chen, Hsin-Chu (TW);
Jin-Sin Liu, Hsin-Chu (TW); Shih-Han Chen, Hsin-Chu (TW)

(73) Assignee: Au Optronics Corporation, Hsinchu (TW)

( * ) Notice: Subject to any disclaimer, the term of this patent is extended or adjusted under 35 U.S.C. 154(b) by 964 days.

(21) Appl. No.: 11/715,477

(22) Filed: Mar. 8, 2007

(65) Prior Publication Data

US 2007/0286479 A1 Dec. 13, 2007

(30) Foreign Application Priority Data

Apr. 4, 2006 (TW) ............... 95111996 A

(51) Int. Cl.
*G06K 9/00* (2006.01)
(52) U.S. Cl. .............................. 382/162
(58) Field of Classification Search ........... 382/162, 382/167, 254; 345/590–591, 593, 600–604; 358/1.9, 500, 504, 518–520
See application file for complete search history.

(56) References Cited

U.S. PATENT DOCUMENTS

| | | | | |
|---|---|---|---|---|
| 4,941,038 A | * | 7/1990 | Walowit | 358/518 |
| 5,231,504 A | * | 7/1993 | Magee | 358/500 |
| 5,416,890 A | * | 5/1995 | Beretta | 345/590 |
| 6,335,983 B1 | * | 1/2002 | McCarthy et al. | 382/162 |
| 6,400,843 B1 | * | 6/2002 | Shu et al. | 382/167 |
| 6,822,760 B1 | * | 11/2004 | Spaulding et al. | 358/1.9 |
| 7,227,666 B1 | * | 6/2007 | MacLeod | 358/1.9 |

FOREIGN PATENT DOCUMENTS

| | | |
|---|---|---|
| CN | 1685739 | 10/2005 |
| CN | 1708097 | 12/2005 |

* cited by examiner

*Primary Examiner*—Jose L Couso
(74) *Attorney, Agent, or Firm*—Rosenberg, Klein & Lee

(57) ABSTRACT

A color correction system and a method thereof are disclosed. A correction system according to the present invention includes an identification unit, a correction unit, and an adjustment module. The way of correction includes following steps: firstly the identification unit receives an image color data and identifies whether the image color data is a specific or a non-specific color data. Then the correction unit corrects the specific color data for display while the non-specific color data is adjusted by the adjustment module according to the color characteristics of the image output device. Therefore, the image data to be displayed is corrected and display quality of the image output device is improved.

34 Claims, 5 Drawing Sheets

COLOR CORRECTION SYSTEM AND METHOD THEREOF

BACKGROUND OF THE INVENTION

The present invention relates to a correction system and a method thereof, especially to a color correction system and a method thereof.

Due to rapid development of backlight technology and color-filter technology, color gamuts displayed by image output devices are getting broader. For example, LCD (liquid crystal display) with three or more color LED backlights or color filters has much wider color gamut than that of the image output devices with traditional specifications such as National Television Standards Committee (NTSC) 72%, standard RGB (sRGB) or European Broadcast Union (EBU).

Most color images available now are generated according to the conventional specification such as sRGB or EBU. Some colors of such kind of images become strange or un-natural when displaying them on the wide color gamut image output devices, especially the memory colors like skin, green grass or blue sky. The color differences between the displayed colors and the desired colors are caused by the different color attributes of the wide color gamut image output devices. Another problem is displaying the images with smaller color gamut on the wide color gamut image output devices can't demonstrate the capabilities of displaying vivid colors of the wide color gamut image output devices, especially for those high saturation non-memory colors.

In order to solve above problems, the present invention provides a color correction system and a method thereof that not only reduces the color differences between the displayed colors and the desired colors but also provide better color appearance for vivid colors.

SUMMARY OF THE INVENTION

Therefore it is a primary object of the present invention to provide a color correction system and a method thereof that correct specific color data for minimizing color differences between the colors displayed on a wide color gamut image output device and the desired colors.

It is another object of the present invention to provide a color correction system and a method thereof that correct non-specific color data for better color appearance on the wide color gamut image output device.

A color correction system according to the present invention consists of an identification unit, a correction unit, and an adjustment module. The correction method of the present invention includes following steps: the identification unit receives an image color data intended to be displayed and identifies whether the image color data is a specific color data or a non-specific color data. Then the correction unit corrects the specific color data for being output and displayed so as to minimize color differences between the colors presented on the image output device and the desired colors. Furthermore, the non-specific color data is adjusted by the adjustment module according to color characteristics of the image output device so as to achieve best visual effects when the image output device displays the non-specific color data.

The adjustment module of the present invention further includes a checking unit, an extension adjustment unit and a mapping adjustment unit. The checking unit is to classify the non-specific data into color data inside the color gamut of an image output device and color data outside the color gamut of an image output device, respectively sent to the extension adjustment unit and the mapping adjustment unit for adjustment. The extension adjustment unit extends and adjusts color data inside the color gamut of the image output device according to the color characteristics of the image output device while the mapping adjustment unit maps and adjusts color data outside the color gamut of the image output device according to the color characteristics of the image output device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
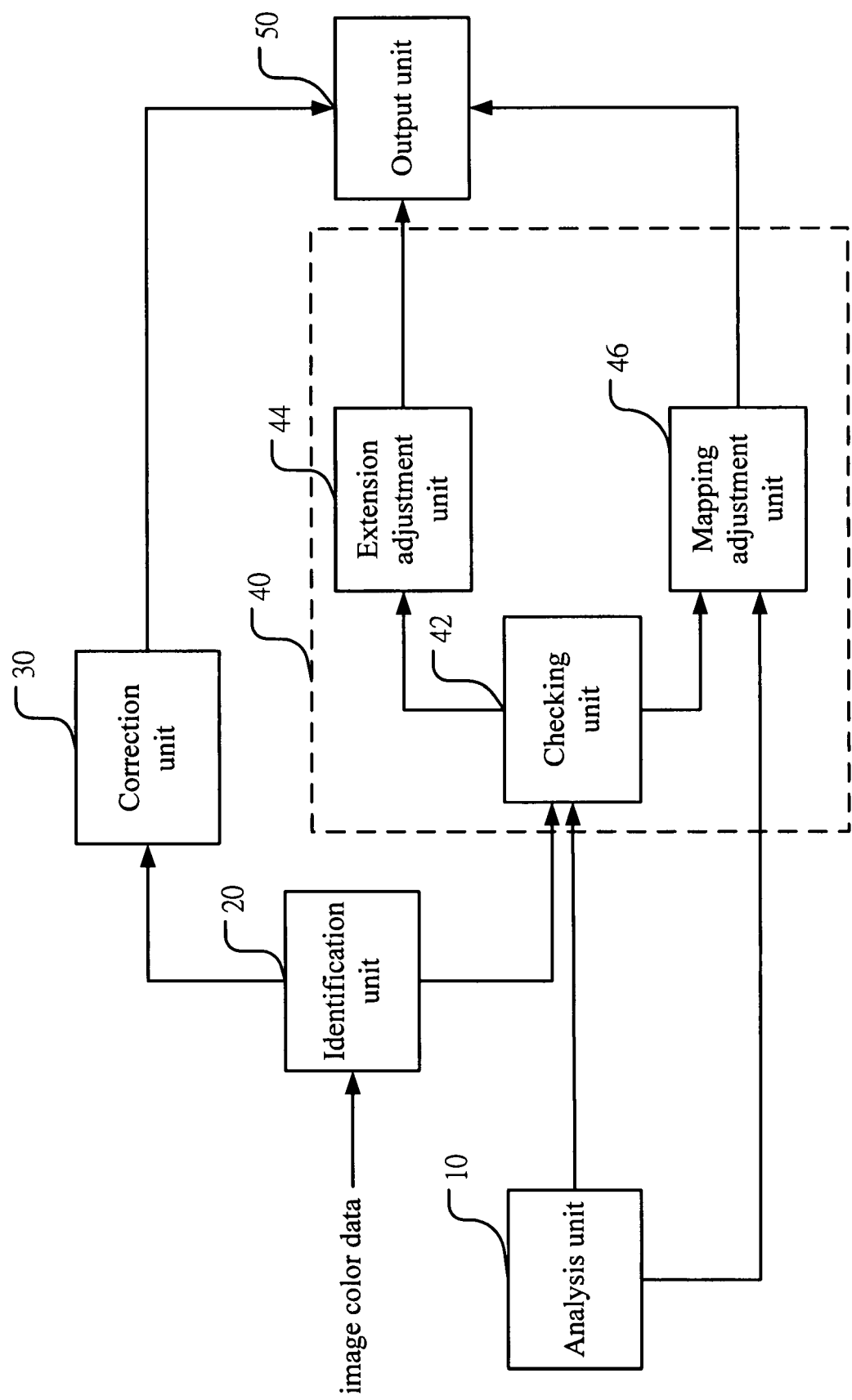
FIG. 1 is a block diagram of an embodiment according to the present invention.

Refer to FIG. 1, the present invention includes an analysis unit 10 that analyzes color characteristics of the image output device. The way for analysis is to input the test color data into the image output device for displaying. Then colorimetric values displayed on the image output device are measured by instruments so as to get the color characteristics of the image output devices. That includes the color gamut and the tone reproduction curves of the image output device. The color gamut is the range of colors that can be produced by a particular device while colors are often described by their attributes of lightness, chroma and hue. For convenience of analysis, a plurality of test color data is input into the image output device and then the displayed colors are measured so as to establish and define the color conversion model and the color correction parameters. Therefore, the output device is characterized by means of software according to the color conversion model and the color correction parameters. By using this modeling and parametric techniques, there is no need to measure each color.

An identification unit 20 receives an image color data that is input into the image output device for display and identifies whether the image color data is a specific or a non-specific color data. The way of identification is according to the predefined color parameters of the identification unit 20 that corresponds to the specific colors. Once the identification unit 20 checks the image color data is a specific color data, the color data is transmitted to a correction unit 30. If the image color data is a non-specific color data, it is transmitted to an adjustment module 40. The color parameters of the identification unit 20 are defined by the attributes of lightness, chroma and hue.

Next, the correction unit 30 corrects the specific color data and outputs the corrected data to an output unit 50 for display so as to avoid color differences between displayed colors and desired colors. The way of correction is to preset correction parameters into the correction unit 30 according to the color differences between the displayed colors and the desired colors. Different specific color data can use different correction parameters. Therefore, in accordance with color characteristics of a specified color, the correction unit 30 corrects color data to minimize the color differences between the displayed colors and the desired colors.

The adjustment module 40 is used to adjust non-specific color data so that the image output device displays the non-specific color data with better color appearance. The adjustment module 40 is composed of a checking unit 42, an extension adjustment unit 44, and a mapping adjustment unit 46.

When the image color data is identified by the identification unit 20 as non-specific color data, the non-specific color data is transmitted to the checking unit 42 for checking whether the non-specific color data is outside the color gamut of the image output device. According to the results of an analysis unit 10, the checking unit 42 classifies the non-specific data into two categories—inside or outside the color gamut of the image output device. The color data inside the color gamut of the image output device are sent to the extension adjustment unit 44 for adjustment; whereas the color data outside the color gamut of the image output device are sent to the mapping adjustment unit 46 for adjustment.

Figure 2:
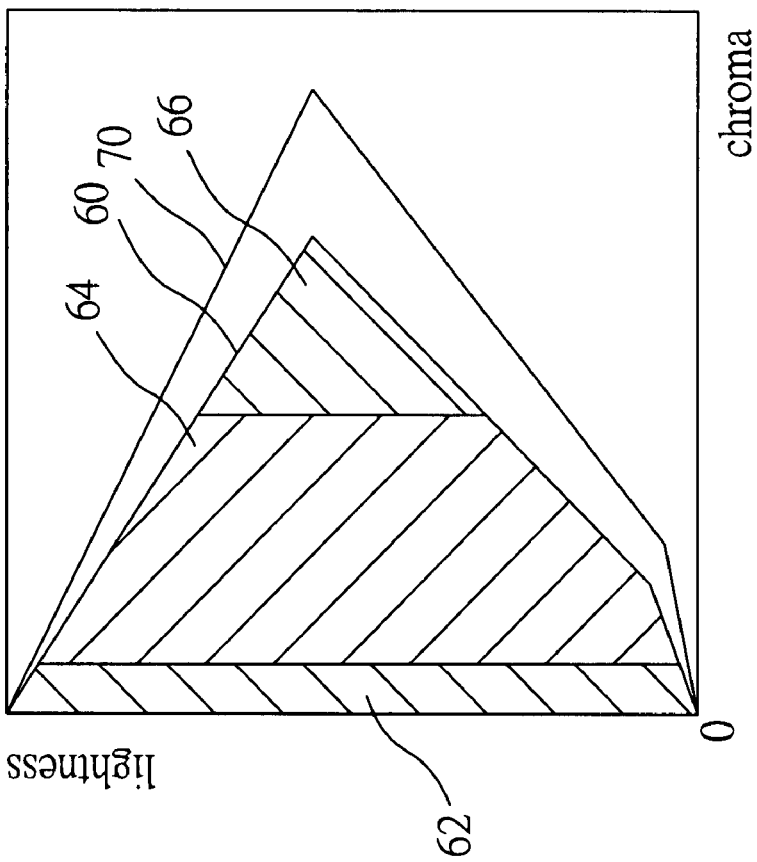
FIG. 2 is a schematic drawing showing how the color data inside the color gamut of an image output device is extended and adjusted by the present invention.

With reference of FIG. 2, an image color template 60 is divided into a plurality of areas. The image color template 60 represents the color gamut of a hue page and it is used to generate the color conversion data. Each of the areas corresponds to an extension parameter respectively and the extension parameter is determined by a corresponding color template 70 of the image output device. The extension adjustment unit 44 checks the location of the color data inside the color gamut of the image output device and then extends as well as adjusts the color data according to the extension parameter corresponding to that area. Next the data is sent to the output unit 50 for display. The extension as well as adjustment of the color data mentioned above is to enhance the attributes of lightness and chroma.

The way of extension and adjustment is to extend and adjust the image color template 60 to the color template 70 for image output device so as to increase color saturation (chroma) of color data within the color gamut of the image output device. And the extension parameters correspond to each of the areas in the image color template 60 are preset inside the extension adjustment unit 44 for adjustment of the color data within color gamut of the image output device. In an embodiment of the present invention, the image color template 60 is divided into a first area 62, a second area 64 and a third area 66. The three area 62, 64, 66 respectively correspond to a first extension parameter E1, a second extension parameter E2 and a third extension parameter E3. It is preferable that E1<E2<E3.

Figure 3:
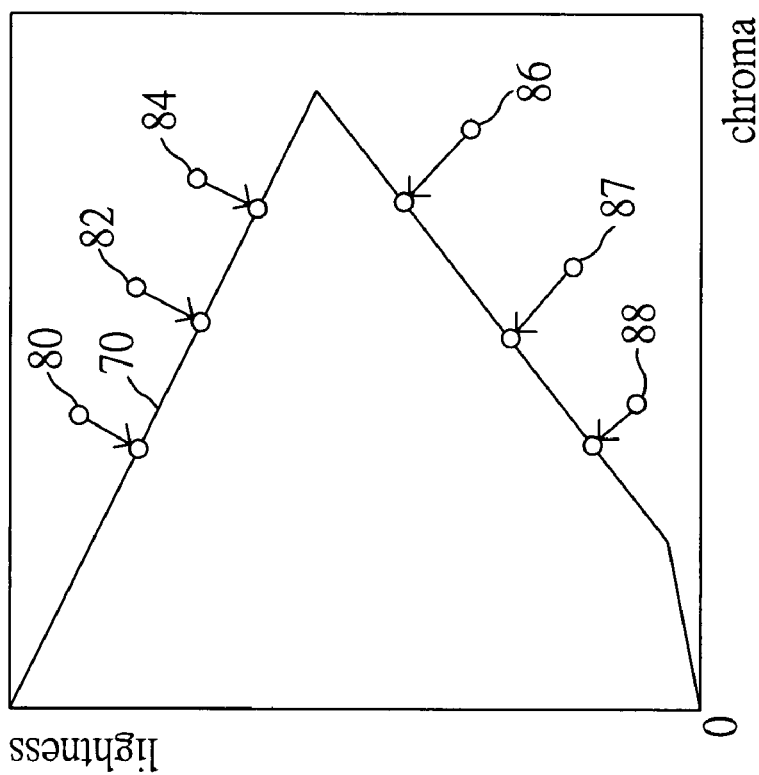
FIG. 3 is a schematic drawing showing how the color data outside the color gamut of an image output device is mapped and adjusted by the present invention.

Refer to FIG. 3, the way for adjusting color data outside the color gamut of the image output device according to the present invention is to map a first color 80 to the boundary of the color template 70 of the image output device in the shortest distance. In similar way, a second color 82 as well as a third color 84 is mapped to the boundary of the color template 70 of the image output device, so does a fourth color 86, a fifth color 87 and a sixth color 88. In other words, the adjustment way according to the present invention is mapping color data outside the color gamut of the image output device to the boundary of the color gamut of the image output device. That means to map the color data outside the color gamut of the image output device into the color gamut of the image output device so as to achieve maximum similarity between the color displayed on the output unit 50 and the color intended to be displayed. Moreover, the correction system of the present invention can be applied to LCD (liquid crystal display) televisions, plasma televisions, projectors, color printers or other kind of image output devices.

Figure 4:
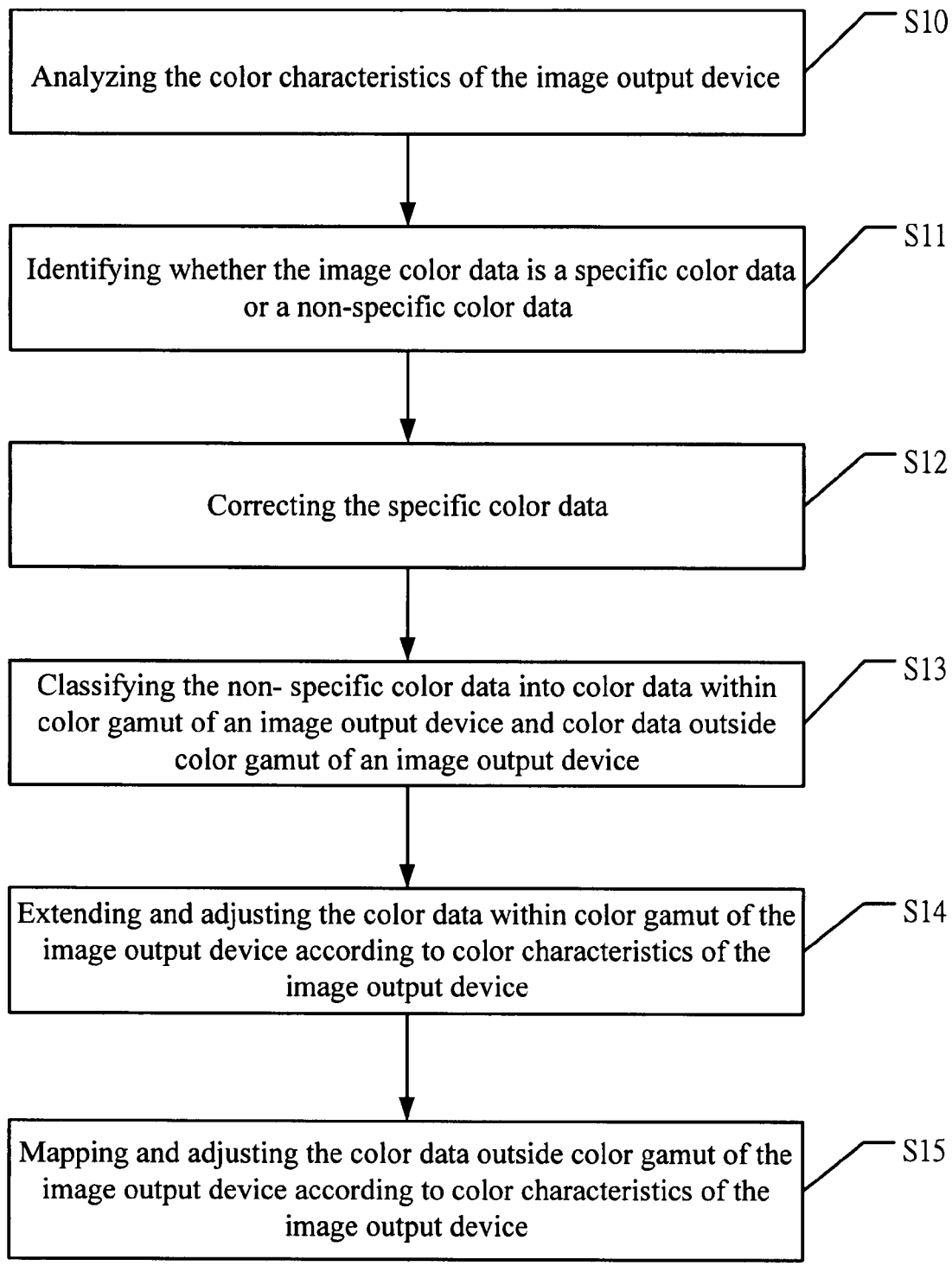
FIG. 4 is a flow chart of an embodiment according to the present invention.

Refer to FIG. 4, a color correction method according to the present invention includes the following steps: take the step S10, analyze color characteristics of the image output device. Then refer to the step S11, identify whether the image color data is a specific color data or a non-specific color data. Next, run the step S12, correct specific color data. According to the color characteristics of a desired color corresponding to the specific color data, the specific color data is corrected so as to minimize the color difference to the desired color. The corrected specific color data is sent to the output device 50 for display.

Moreover, take the step S13, classify the non-specific color data into a color data in the color gamut of the image output device and a color data outside the color gamut of the image output device. Then run the step S14, extend and adjust the color data in the color gamut of the image output device according to the color characteristics of the image output device so that the colors represented on the image output device become more vivid. Refer to the step S15, map and adjust color data outside the color gamut of the image output device according to the color characteristics of the image output device and then the data are sent to the output unit 50 for display. That means to map color data outside color gamut of the image output device to the boundary of the color gamut of the image output device so as to achieve maximum similarity of the color presented on the image output device and the color intended to display.

Figure 5:
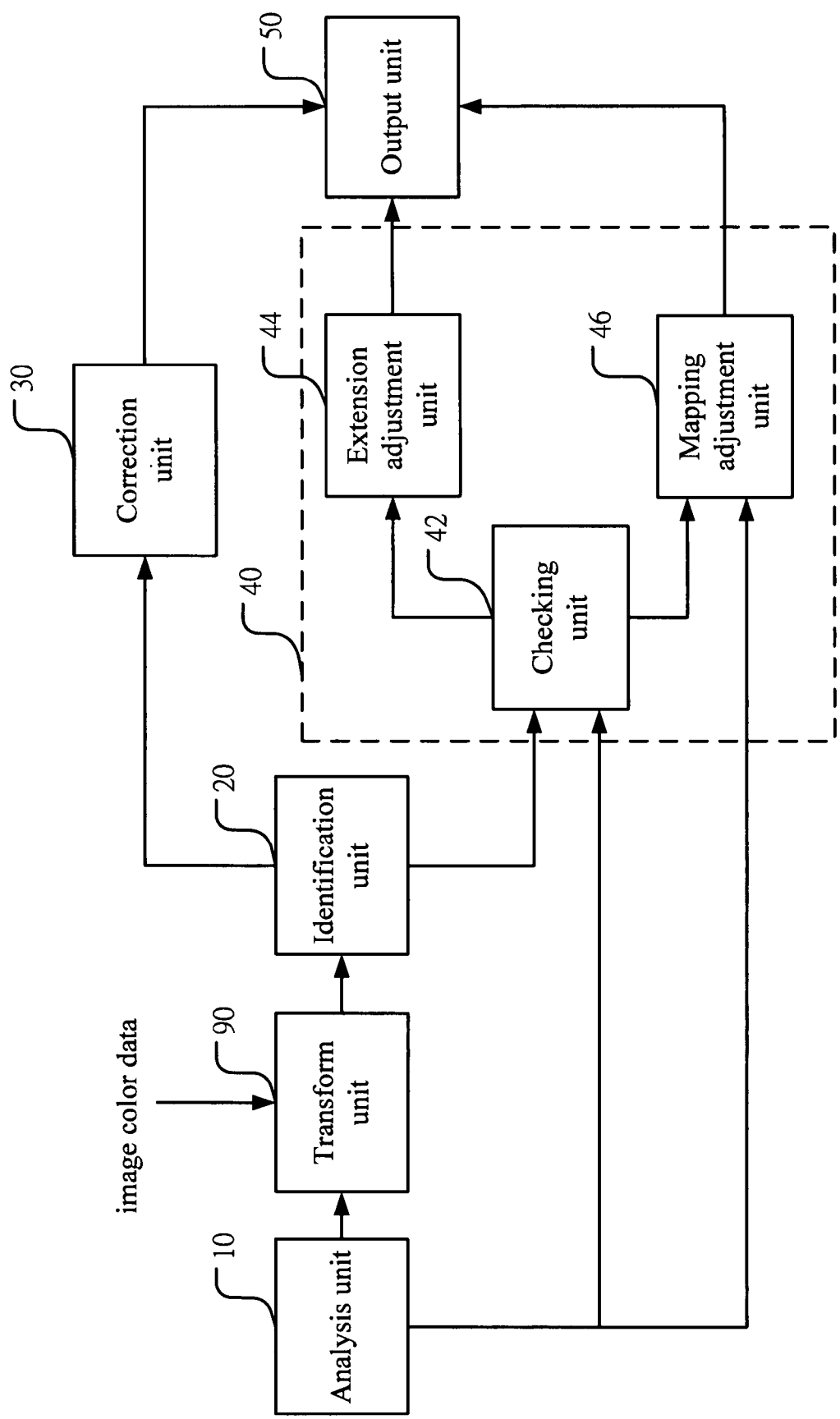
FIG. 5 is a block diagram of another embodiment according to the present invention.

Refer to FIG. 5, a block diagram of another embodiment according to the present invention is disclosed. Generally, image color data is in RGB color space while the present invention, three attributes (lightness, chroma and hue) are used for correcting image data because they are closer to human perception than RGB data. In this embodiment, a transform unit 90 for converting color data in RBG or other format into data in LCH color space is added. The way of transforming data according to the embodiment of the present invention is to generate a set of transform parameters by the analysis unit 10 according to the color characteristics of the image output device and the parameters are sent to the transform unit 90. Then according to these transform parameters, the transform unit 90 transforms the RGB color data into LCH color space and then the transformed data are sent to the identification unit 20 for recognition.

Figure 6:
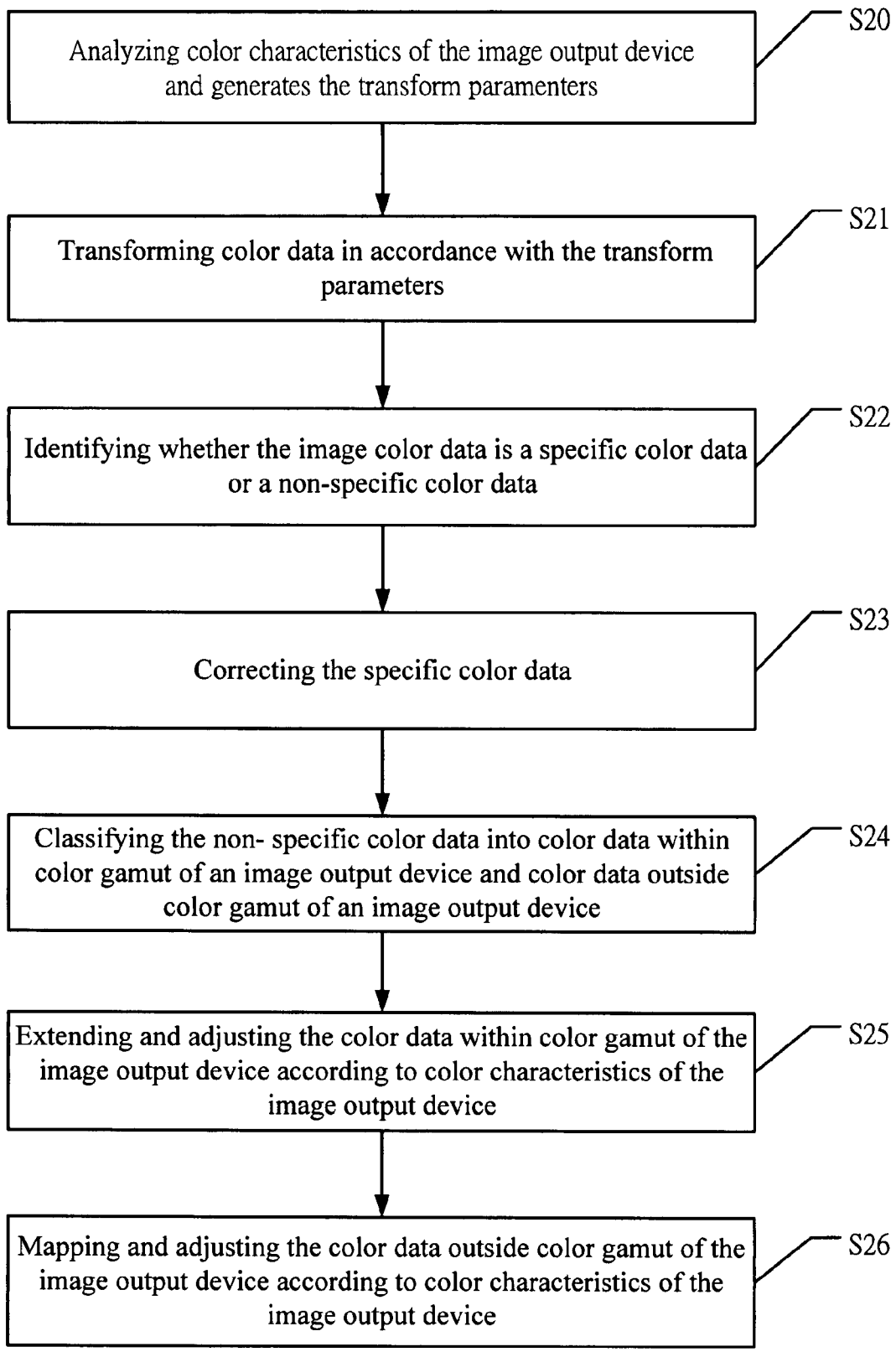
FIG. 6 is a flow chart of another embodiment according to the present invention.

Refer to FIG. 6, the differences between this embodiment and the embodiment in FIG. 4 are in that: refer to step S20, besides analyzing the color characteristics of the image output device, the analysis unit 10 also generates the transform parameters according to the color characteristics of the image output device. Next, the transform unit 90 runs step S21, transform color data in accordance with the transform parameters and then the data are sent to the identification unit 20 for identification. The rest steps from the step S22 to the step S26 are the same with the steps from the step S11 to the step S15 of the embodiment in FIG. 4.

In summary, a correction system according to the present invention includes an identification unit, a correction unit, and an adjustment module. A correction method in accordance with the present invention comprising the following steps: identify whether the image color data is a specific or a non-specific color data by the identification unit. Then the correction unit corrects the specific color data while the non-specific color data is adjusted by the adjustment module according to color characteristics of the image output device. Thus the image data to be displayed is corrected so as to improve display quality of the image output device. Moreover, a correction system of the present invention can be applied to liquid crystal display (LCD) televisions, plasma televisions or other kind of image output devices.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color correction system executed in an image output device for displaying color images, the color correction system comprising:
    an identification unit for receiving image color data corresponding to a color image and identifying whether the image color data is a specific or a non-specific type of color data;
    a correction unit for correcting the specific color data;
    a checking unit for classifying the non-specific color data into color data within color gamut of an image output device or color data outside color gamut of an image output device;
    an extension adjustment unit for extending and adjusting color data within color gamut of the image output device with respect to color characteristics of the image output device; and
    a mapping adjustment unit for mapping and adjusting color data outside color gamut of the image output device with respect to color characteristics of the image output device;
    the extension and mapping adjustment units alternatively operating on the color data according to the classification thereof to automatically adjust visible attributes of the corresponding color image.

2. The system as claimed in claim 1, wherein the color correction system further comprises an analysis unit for analyzing color characteristics of the image output device.

3. The system as claimed in claim 2, wherein the color correction system further comprises a transform unit for receiving a set of transform parameters according to the color characteristics of the image output device generated by the analysis unit so that the transform unit transforming the image color data in accordance with the transform parameters and sending the image color data to the identification unit.

4. The system as claimed in claim 1, wherein the extension adjustment unit is configured to extend as well as adjust lightness and chroma of the color data within color gamut of the image output device.

5. The system as claimed in claim 1, wherein the mapping adjustment unit is configured to map and adjust color data outside color gamut of the image output device into the boundary of the color gamut of the image output device.

6. The system as claimed in claim 1, wherein the correction unit is configured to correct the specific color data in accordance with the color characteristics of a desired color.

7. The system as claimed in claim 1, wherein the color characteristics of the image output device includes lightness, chroma, and hue.

8. The system as claimed in claim 1, wherein the color characteristics of the image output device includes color gamut of the image output device.

9. A color correction system executed in an image output device for displaying color images, the color correction system comprising:
    an identification unit for receiving image color data corresponding to a color image and identifying whether the image color data is a specific or a non-specific type of color data;
    a correction unit for correcting the specific color data; and
    an adjustment module for alternatively adjusting the non-specific color data according to a classification thereof with respect to the color characteristics of the image output device to automatically adjust visible attributes of the corresponding color image.

10. The system as claimed in claim 9, wherein the color correction system further comprises an analysis unit for analyzing color characteristics of the image output device.

11. The system as claimed in claim 10, wherein the color correction system further comprises a transform unit for receiving a set of transform parameters according to the color characteristics of the image output device generated by the analysis unit so that the transform unit transforming the image color data in accordance with the transform parameters and sending the image color data to the identification unit.

12. The system as claimed in claim 9, wherein the adjustment module comprises:
    a checking unit that classifies the non-specific color data into color data within color gamut of an image output device or color data outside color gamut of an image output device;
    an extension adjustment unit for extending and adjusting color data within color gamut of the image output device with respect to the color characteristics of the image output device; and
    a mapping adjustment unit mapping and adjusting color data outside color gamut of the image output device with respect to the color characteristics of the image output device.

13. The system as claimed in claim 12, wherein the extension adjustment unit is for extending as well as adjusting lightness and chroma of the color data within color gamut of the image output device.

14. The system as claimed in claim 12, wherein the mapping adjustment unit maps and adjusts color data outside color gamut of the image output device to the boundary of the color gamut of the image output device.

15. The system as claimed in claim 9, wherein the color characteristics of the image output device includes color gamut of the image output device.

16. The system as claimed in claim 9, wherein the color characteristics of the image output device includes lightness, chroma and hue.

17. The system as claimed in claim 9, wherein the correction unit corrects the specific color data in accordance with the color characteristics of a desired color.

18. A color correction method executed in an image output device for displaying color images, the color correction method comprising:
    identifying whether image color data corresponding to a color image is a specific or a non-specific type of color data;
    correcting the specific color data;
    classifying the non-specific color data into color data within color gamut of an image output device and color data outside color gamut of an image output device;
    extending and adjusting the color data within color gamut of the image output device with respect to the color characteristics of the image output device; and mapping and adjusting the color data outside color gamut of the image output device with respect to the color characteristics of the image output device;

the color data being alternatively adjusted according to the classification thereof to automatically adjust visible attributes of the corresponding color image.

19. The method as claimed in claim 18, wherein the color correction method further comprises analyzing the color characteristics of the image output device.

20. The method as claimed in claim 19, wherein after analyzing the color characteristics of the image output device, the method further comprises:

generating a set of transform parameters according to the color characteristics of the image output device; and transforming the image color data according to the transform parameters.

21. The method as claimed in claim 18, wherein extending and adjusting the color data within color gamut of the image output device according to the color characteristics of the image output device is to extend and adjust the lightness or chroma of the color data within color gamut of the image output device.

22. The method as claimed in claim 18, wherein mapping and adjusting the color data outside color gamut of the image output device according to the color characteristics of the image output device is to map and adjust color data outside color gamut of the image output device into the boundary of the color gamut of the image output device.

23. The method as claimed in claim 18, wherein correcting the specific color data is to correct the specific color data according to the color characteristics of a desired color.

24. The method as claimed in claim 18, wherein the color characteristics of the image output device includes lightness, chroma and hue.

25. The method as claimed in claim 18, wherein the color characteristics of the image output device includes color gamut of the image output device.

26. A color correction method executed in an image output device for displaying color images, the color correction method comprising the steps of:

identifying whether image color data corresponding to a color image is a specific or a non-specific type of color data;

correcting the specific color data; and alternatively adjusting the non-specific color data according to a classification thereof with respect to the color characteristics of an image output device to automatically adjust visible attributes of the corresponding color image.

27. The method as claimed in claim 26, wherein the color correction method further comprises a step of analyzing the color characteristics of the image output device.

28. The method as claimed in claim 27, wherein after the step of analyzing the color characteristics of the image output device, the method further comprises a step of:

generating a set of transform parameters according to the color characteristics of the image output device and transforming the image color data according to the transform parameters.

29. The method as claimed in claim 26, wherein the step of adjusting the non-specific color data according to the color characteristics of an image output device further comprising the steps of:

classifying the non-specific color data into color data within color gamut of an image output device and color data outside color gamut of an image output device;

extending and adjusting the color data within color gamut of the image output device with respect to the color characteristics of the image output device; and mapping and adjusting the color data outside color gamut of the image output device with respect to the color characteristics of the image output device.

30. The method as claimed in claim 29, wherein the step of extending and adjusting the color data within color gamut of the image output device according to the color characteristics of the image output device is to extend and adjust lightness or chroma of the color data within color gamut of the image output device.

31. The method as claimed in claim 29, wherein the step of mapping and adjusting the color data outside color gamut of the image output device according to the color characteristics of the image output device is to map and adjust color data outside color gamut of the image output device to the boundary of the color gamut of the image output device.

32. The method as claimed in claim 26, wherein the step of correcting the specific color data is to correct the specific color data according to the color characteristics of a desired color.

33. The method as claimed in claim 26, wherein the color characteristics of the image output device includes lightness, chroma and hue.

34. The method as claimed in claim 26, wherein the color characteristics of the image output device includes color gamut of the image output device.

* * * * *